US011355118B2

(12) United States Patent
Sgobba et al.

(10) Patent No.: US 11,355,118 B2
(45) Date of Patent: Jun. 7, 2022

(54) VIRTUAL ASSISTANTS HARMONIZATION

(71) Applicant: KYNDRYL, INC., New York, NY (US)

(72) Inventors: Nicolò Sgobba, Fasano (IT); Erik Rueger, Ockenheim (DE); Amit Anil Nanavati, New Delhi (IN); Guillermo Rodriguez de Vera Beltri, Brno (CZ)

(73) Assignee: Kyndryl, Inc., New York, NY (US)

( * ) Notice: Subject to any disclaimer, the term of this patent is extended or adjusted under 35 U.S.C. 154(b) by 149 days.

(21) Appl. No.: 17/021,660

(22) Filed: Sep. 15, 2020

(65) Prior Publication Data

US 2022/0084513 A1    Mar. 17, 2022

(51) Int. Cl.
| | | |
|---|---|---|
| *G10L 15/22* | (2006.01) | |
| *G10L 15/06* | (2013.01) | |
| *G10L 15/32* | (2013.01) | |
| *G06N 3/08* | (2006.01) | |
| *G10L 15/16* | (2006.01) | |

(52) U.S. Cl.
CPC ............. *G10L 15/22* (2013.01); *G06N 3/08* (2013.01); *G10L 15/063* (2013.01); *G10L 15/16* (2013.01); *G10L 15/32* (2013.01); *G10L 2015/223* (2013.01)

(58) Field of Classification Search
CPC ....... G10L 15/22; G10L 15/063; G10L 15/16; G10L 15/32; G10L 2015/223; G06N 3/08
See application file for complete search history.

(56) References Cited

U.S. PATENT DOCUMENTS

| | | | |
|---|---|---|---|
| 9,396,727 B2 * | 7/2016 | Tzirkel-Hancock | .... G10L 15/22 |
| 10,381,006 B1 * | 8/2019 | Eriksson | ................. G10L 15/22 |
| 10,482,904 B1 * | 11/2019 | Hardie | .................... G10L 15/22 |
| 11,290,537 B1 * | 3/2022 | Argenti | ................... H04L 67/16 |
| 2004/0044516 A1 * | 3/2004 | Kennewick | ......... G10L 15/1822 |
| | | | 704/E15.04 |
| 2017/0018271 A1 * | 1/2017 | Khan | ...................... G10L 15/24 |
| 2018/0285741 A1 | 10/2018 | Marshall | |
| 2018/0293484 A1 | 10/2018 | Wang | |
| 2019/0103092 A1 * | 4/2019 | Rusak | ................. G06N 3/0454 |
| 2019/0243899 A1 | 8/2019 | Xing | |
| 2019/0251960 A1 | 8/2019 | Maker | |
| 2019/0317994 A1 | 10/2019 | Singh | |
| 2020/0105273 A1 | 4/2020 | O'Donovan | |
| 2020/0394360 A1 * | 12/2020 | Dunn | ...................... G06N 3/08 |

(Continued)

*Primary Examiner* — Mohammad K Islam
(74) *Attorney, Agent, or Firm* — Schmeiser, Olsen & Watts, LLP; Erik Swanson

(57) ABSTRACT

The present disclosure relates to a method of coordinating personal assistants. The method comprises: sending a request to a set of personal assistants based on a received query. Assistant responses may be received in response to the request from respective personal assistants of the set of personal assistants. Each assistant response of the assistant responses comprises a confidence score of the respective assistant response. The confidence scores may be adjusted to a common scale. The adjusted confidence scores may be weighted using domain-specific weights of the personal assistants in accordance with the domain of the query. One or more assistant responses of the received assistant responses may be selected based on the weighted scores and the selected assistant responses may be provided to the user.

20 Claims, 9 Drawing Sheets

(56) References Cited

U.S. PATENT DOCUMENTS

| | | | |
|---|---|---|---|
| 2021/0056968 A1* | 2/2021 | Shreeshreemal | G06N 20/00 |
| 2021/0073291 A1* | 3/2021 | Hunter | G06F 8/65 |
| 2021/0120206 A1* | 4/2021 | Liu | G06V 10/82 |

* cited by examiner

| Questions | Answers | Domains | Assistant 1 | Assistant2 | ... | Assistant N |
|---|---|---|---|---|---|---|
| How do I reset my Gmail password? | Here is the link LINK | GMail Support | 0.7 | 0.6 | ... | 0.3 |
| How do I get my tax declaration module for Czech Republic? | This module can be found on the Government website at this link LINK | Taxes | 0.2 | 0.8 | ... | 0.4 |
| How do I switch on the emergency light? | You have to look for this symbol on your dashboard: SYMBOL | Automotive, Dashboards | 0.1 | 0.1 | ... | 0.8 |
| Which kind of charging station fits for my Tesla car? | Your car is only compatible with the Tesla charging system | Automotive, Electric Cars | 0.1 | 0.1 | ... | 0.9 |
| ... | ... | ... | ... | ... | ... | ... |

Fig. 3B

| Questions | 100% correct answers | Assistants' answers | Assistants' confidence levels | Normalization factors | Average normalization factors |
|---|---|---|---|---|---|
| How do I reset my Gmail password? | Here is the link LINK | Sorry, I don't understand you question | 0.1 | +0.9 | |
| How do I get my tax declaration module for Czech Republic? | This module can be found on the Government website at this link. LINK | It can be found at this link. LINK | 0.7 | +0.3 | (0.9+0.3+0.1+ 0.2)/4 = 0.375 |
| How do I switch on the emergency light? | You have to look for this symbol on your dashboard: SYMBOL | You have to look for this symbol on your dashboard: SYMBOL | 0.9 | +0.1 | |
| Which kind of charging station fits for my Tesla car? | Your car is only compatible with the Tesla charging system | Your car is only compatible with the Tesla system | 0.8 | +0.2 | |
| ... | | | ... | ... | ... |

| Assistants' answers | Normalization factor | Gen'l ave. confidence level | Taxes confidence level | Automotive confidence level | Healthcare confidence level | HR confidence level |
|---|---|---|---|---|---|---|
| A1 | 0.2 | 0. | 0.8 | 0.2 | 0. | 0.3 |
| A2 | 0.7 | 0.4 | 0.1 | 0.9 | 0.1 | 0.2 |
| A3 | 0.1 | 0.6 | 0.9 | 0.1 | 0.1 | 0.1 |
| A4 | 0.3 | 0.1 | 0.1 | 0.8 | 0.0 | 0.1 |
| ... | ... | ... | ... | ... | ... | ... |

Fig. 4C (421)

| Assistants' answers | Normalization factor | General average confidence level | User-specific feedback normalization factor | Taxes confidence level | Automotive confidence level | Healthcare confidence level | HR confidence level |
|---|---|---|---|---|---|---|---|
| A1 | 0.2 | 0.1 | 0.0 | 0.8 | 0.2 | 0.2 | 0.3 |
| A2 | 0.7 | 0.4 | 0.1 | 0.1 | 0.9 | 0.1 | 0.2 |
| A3 | 0.1 | 0.6 | 0.0 | 0.9 | 0.1 | 0.1 | 0.1 |
| A4 | 0.3 | 0.1 | 0.0 | 0.1 | 0.8 | 0.0 | 0.1 |
| ... | ... | ... | ... | ... | ... | ... | ... |

VIRTUAL ASSISTANTS HARMONIZATION

BACKGROUND

The present disclosure relates to the field of digital computer systems, and more specifically, to a method of coordinating personal assistants.

Virtual assistants perform tasks and answer questions for a user based on queries. The virtual assistants may be conversational, computer-generated characters that simulate a conversation to deliver voice-/text-based information to a user. Numerous virtual assistants exist today.

SUMMARY

Various embodiments provide a method of coordinating personal assistants, computer system and computer program product as described by the subject matter of the independent claims. Advantageous embodiments are described in the dependent claims. Embodiments of the present invention can be freely combined with each other if they are not mutually exclusive.

In one aspect, computer-implemented method includes receiving a query from a user, determining a domain to which the query belongs, and sending a request to a set of personal assistants based on the received query. The method also includes receiving assistant responses in response to the request from respective personal assistants of the set of personal assistants. Each assistant response of the assistant responses includes a confidence score of the respective assistant response. The method further includes adjusting the confidence scores to a common scale and weighting the adjusted confidence scores using domain-specific weights of the personal assistants in accordance with the determined domain. The method also includes selecting one or more assistant responses of the received assistant responses based on the weighted scores and providing the selected assistant responses to the user.

In another aspect, a computer program product is provided to leverage a learning-based approach to automatically discover related datasets to join with known datasets to facilitate building machine learning models. The computer program product includes one or more computer readable storage media, and program instructions collectively stored on the one or more computer storage media. The product also includes program instructions to receive a query from a user, determine a domain to which the query belongs, and send a request to a set of personal assistants based on the received query. The product further includes program instructions to receive assistant responses in response to the request from respective personal assistants of the set of personal assistants. Each assistant response of the assistant responses includes a confidence score of the respective assistant response. The product also includes program instructions to adjust the confidence scores to a common scale and weight the adjusted confidence scores using domain-specific weights of the personal assistants in accordance with the determined domain. The product further includes program instructions to select one or more assistant responses of the received assistant responses based on the weighted scores and provide the selected assistant responses to the user.

In another aspect, a computer system is provided. The system includes a processor and at least one memory device operably coupled to the processor. The processor is configured to receive a query from a user, determine a domain to which the query belongs, and send a request to a set of personal assistants based on the received query. The processor is also configured to receive assistant responses of the request from respective personal assistants of the set of personal assistants. Each assistant response of the assistant responses includes a confidence score of the respective assistant response. The processor is further configured to adjust the confidence scores to a common scale, and weight the adjusted confidence scores using domain-specific weights of the personal assistants in accordance with the determined domain. The processor is also configured to select one or more assistant responses of the received assistant responses based on the weighted scores and provide the selected assistant responses to the user.

BRIEF DESCRIPTION OF THE DRAWINGS

In the following embodiments of the invention are explained in greater detail, by way of example only, making reference to the drawings in which:

FIG. 3B depicts a training dataset in accordance with an example of the present subject matter.

FIG. 3C depicts a training dataset in accordance with an example of the present subject matter.

FIG. 4B is a table summarizing the normalization factors and the domain-specific weights in accordance with an example of the present subject matter.

FIG. 4C is a table summarizing the normalization factors and the domain-specific weights in accordance with an example of the present subject matter.

DETAILED DESCRIPTION

Figure 1A:
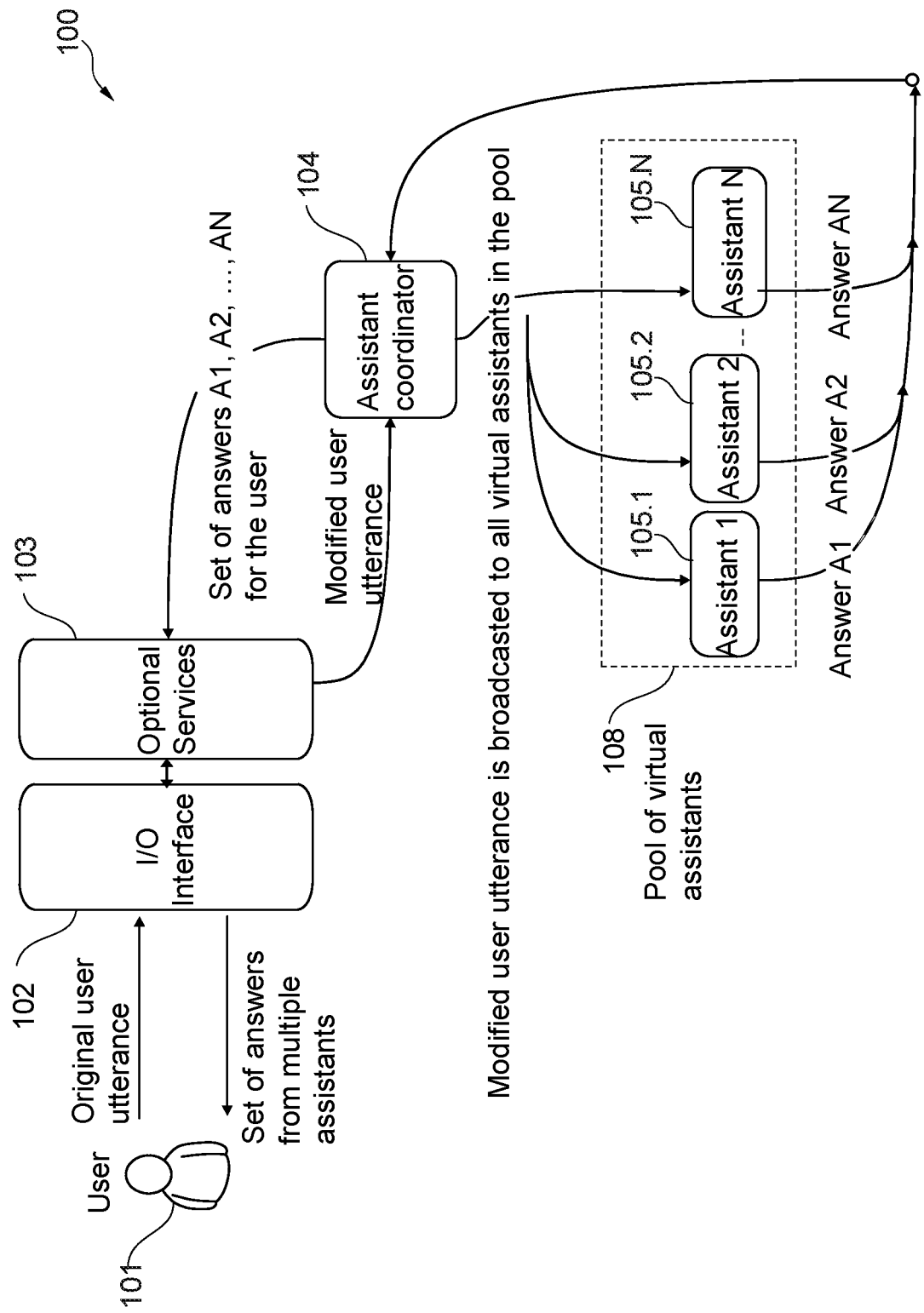
FIG. 1A is a block diagram of a system for user assistants in accordance with an example of the present subject matter.

The descriptions of the various embodiments of the present disclosure will be presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

A personal assistant or virtual assistant or intelligent personal assistant (IPA) may be a software agent that may perform tasks or services for an individual based on commands or questions. The personal assistant may, for example, be a chatbot. Several types of personal assistants may exist. The present subject matter may improve access to services provided by the personal assistants. In particular, using multiple personal assistants to serve the same request may be advantageous as it may provide the user with multiple possible answers or responses to the request. The user may select an answer among the list of all the answers collected by the different assistants. Thus, the user may not have to perform multiple attempts with a single personal assistant in order to get the right answer. This may save processing resources that would otherwise be required to perform such a multi-attempt process. However, the answers of the personal assistants may not be consistent (e.g. with the same tone or same register). This may increase the probability of selecting the wrong answer. The present subject matter may further improve access to services provided by personal assistants by controlling the consistency of the answers provided by the multiple personal assistants. This may enable the user to select the right answer based on comparable answers. However, although consistent the list of answers provided to the user may be too long and the user may have to spend considerable time reading and selecting the right answer. The present subject matter may solve this issue and thus further improve access to services provided by personal assistants by taking into account the domain of interest of the user. The present subject matter may provide answers which match the domain represented by the request. The domain may represent concepts or categories which belong to a part of the world, such as biology or politics. The domain typically models domain-specific definitions of terms. For example, a domain can refer to healthcare, advertising, commerce, medical and/or biomedical-specific field.

The consistency of the answers may be controlled using confidence scores associated with the answers. Indeed, different personal assistants may use different criteria to evaluate the confidence score. This may result in different scales of the confidence scores. The present subject matter may solve this issue by normalizing the confidence scores in order to bring them into a common scale where they can reliably be compared. For that, normalization factors may be determined for the set of personal assistants respectively. In one example, the determination of the normalization factors may be performed by understanding the method used by each of the personal assistants in order to compute the confidence score. However, this may be challenging in case of a high number of assistants. The present subject matter may solve this issue by determining the normalization factors as follows as part of a pre-processing method. According to one embodiment, the method further comprises: determining a set of training requests and associated reference responses, where each reference response comprises a reference confidence score. The set of training requests and associated reference responses may be part of a pre-processing dataset. For each personal assistant of the set of personal assistants: sending the set of training requests to the personal assistant and receiving a set of responses from the personal assistant. Each received response comprises (or associated with) a training confidence score. A normalization factor may be determined based on differences between the set of training confidence scores and the set of reference confidence scores respectively. For example, the normalization factor may be the averaged difference (i.e. the average of the differences). The confidences scores may thus be normalized using the determined normalization factors respectively.

In order to provide answers that match the domain represented by the received query, the present subject matter may assign to each assistant of the set of personal assistants multiple weights, wherein each weight of the multiple weights is specific to a given domain. The weights may be determined as part of the pre-processing method. This may enable to weight the normalized confidence scores so that they can be ranked based on the domain of interest. The weights for a specific domain may be determined by querying a pool of personal assistants using a request that represents the specific domain and the assistants may be assigned weights based on their answers e.g. the assistant that provided the best answer may be assigned the highest weight. The best answer may be the answer with the highest normalized confidence score. Thus, according to one embodiment, the method further comprises: for each domain of a set of domains: sending one or more requests of the domain to a pool of personal assistants comprising the set of personal assistants and receiving from each personal assistant one or more responses regarding the respective requests, each comprising a confidence score. For each personal assistant of the pool of personal assistants, a domain-specific confidence score may be determined based on the received confidence scores of the personal assistant. The domain-specific confidence scores may be adjusted to a common scale and the pool of personal assistants may be ranked based on the adjusted domain-specific confidence scores. Domain-specific weights may be assigned to the pool of personal assistants respectively based on the ranking.

The pool of personal assistants that are used to determine the specific domain weights may comprise assistants which may not be useful for the present query as they may not have a good knowledge of the domain represented by the received query. The present subject matter may solve this issue by querying only part of the pool of personal assistants. This may further improve access to services provided by personal assistants. Thus, according to one embodiment, the method further comprises: selecting the set of personal assistants, that have been used by the runtime method, from the pool of personal assistants based on the domain-specific confidence scores of the determined domain.

According to one embodiment, the method further comprises: receiving a selection of one of the provided assistant responses, adapting the domain-specific weight of the personal assistant that sent the selected assistant response, for further execution of the method. This embodiment may enable a self-improving system by continuously adapting the domain-specific weights based on user inputs. For example, the resulting adapted specific weights may be used when executing the runtime method for a further received query.

According to one embodiment, determining the domain to which the query belongs comprises inputting the query to a trained machine learning model (also named domain predictive model), and in response receiving the determined domain. This embodiment may enable an accurate determination of the domain.

According to one embodiment, the method further comprises: receiving a training dataset (initial training dataset). Each entry of the training dataset comprises a triplet formed of a request, a response of the request and a domain of the request. A machine learning algorithm may be trained using the training dataset, thereby generating the trained machine learning model.

In one example, the training dataset may be the same as the pre-processing dataset. That is, the training dataset may be used for both: training the machine learning algorithm and performing the pre-processing method described herein. In another example, the pre-processing dataset may be a subset of the training dataset. In another example, the training dataset may be a subset of the pre-processing dataset. In another example, the pre-processing dataset may be different from the training dataset.

The term "machine learning" refers to a computer algorithm used to extract useful information from training data sets by building probabilistic models (referred to as machine learning models or "predictive models") in an automated way. Machine learning algorithms build a mathematical model based on sample data, known as "training data", in order to make predictions or decisions without being explicitly programmed to perform the task. The machine learning may be performed using a learning algorithm such as supervised or unsupervised learning, [clustering, classification, linear regression,] reinforcement algorithm, self-learning, etc. The machine learning may be based on various techniques such as clustering, classification, linear regression, support vector machines, neural networks, etc. A "model" or "predictive model" may for example be a data structure or program such as a neural network, a support vector machine, a decision tree, a Bayesian network etc. The model is adapted to predict an unmeasured value (e.g. which tag corresponds to a given token) from other, known values and/or to predict or select an action to maximize a future reward. According to one example, the machine learning model is a deep learning model.

According to one embodiment, the machine learning model is an artificial neural network.

According to one embodiment, in case the domain of the query cannot be determined, the training may be repeated using an updated training dataset. For example, the updated training dataset may be obtained by augmenting the initial training dataset with further entries or by replacing the initial training dataset with another training dataset.

According to one embodiment, the query is any one of a voice input, video input, text input and image input. For example, the query may be received as a text, speech, graphics, haptics, gestures, or other modes for communication. The computer system may be configured to process such query in order to perform the present subject matter. The assistant response to the query may comprise one or more data items. A data item of the assistant response may, for example, be provided as a text or speech or other means that enables the user to access the assistant response.

FIG. 1A is a block diagram of a system 100 for user assistants in accordance with an example of the present subject matter.

Figure 1B:
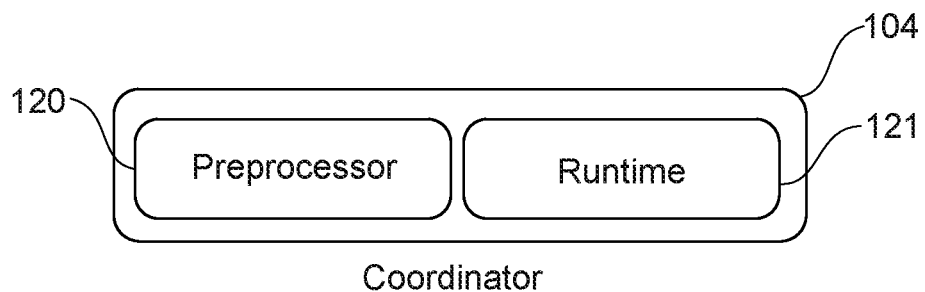
FIG. 1B is a block diagram of an assistant coordinator in accordance with an example of the present subject matter.

The system 100 may include an input/output (I/O) interface 102 to receive an input e.g. query from a user 101. The input may, for example, be a user utterance. The system 100 may further comprise optional services 103. The optional services 103 may, for example, be configured to modify received user inputs so that they can be further processed. The optional services 103 may, for example, further be configured to process received assistant answers in order to provide them (e.g. display them, translate them) to the user 101. The system 100 further comprises an assistant coordinator 104. For example, the assistant coordinator 104 may be configured to forward the input as received or send the modified user input to the personal assistants (also named virtual assistants) 105.1 through 105.N of a pool of virtual assistants 108. In response to sending the input to the personal assistants 105.1 through 105.N, the assistant coordinator 104 may receive an answer from each of the personal assistants 105.1 through 105.N. The answers are then provided to the user 101 e.g. via the optional services 103. The personal assistants 105.1 through 105.N may, for example, comprise IBM Watson Assistant, Google Assistant, Amazon Alexa, Microsoft Cortana, Apple Siri etc. The assistant coordinator 104 may be configured to perform at least part of the present subject matter. A shown in FIG. 1B, the assistant coordinator 104 may comprise a pre-processing unit 120 and runtime unit 121. The pre-processing unit 120 may be configured to perform the pre-processing method and the runtime unit 121 may be configured to perform the runtime method. The operation of the system 100 may further be described with reference to the following Figures.

Figure 2:
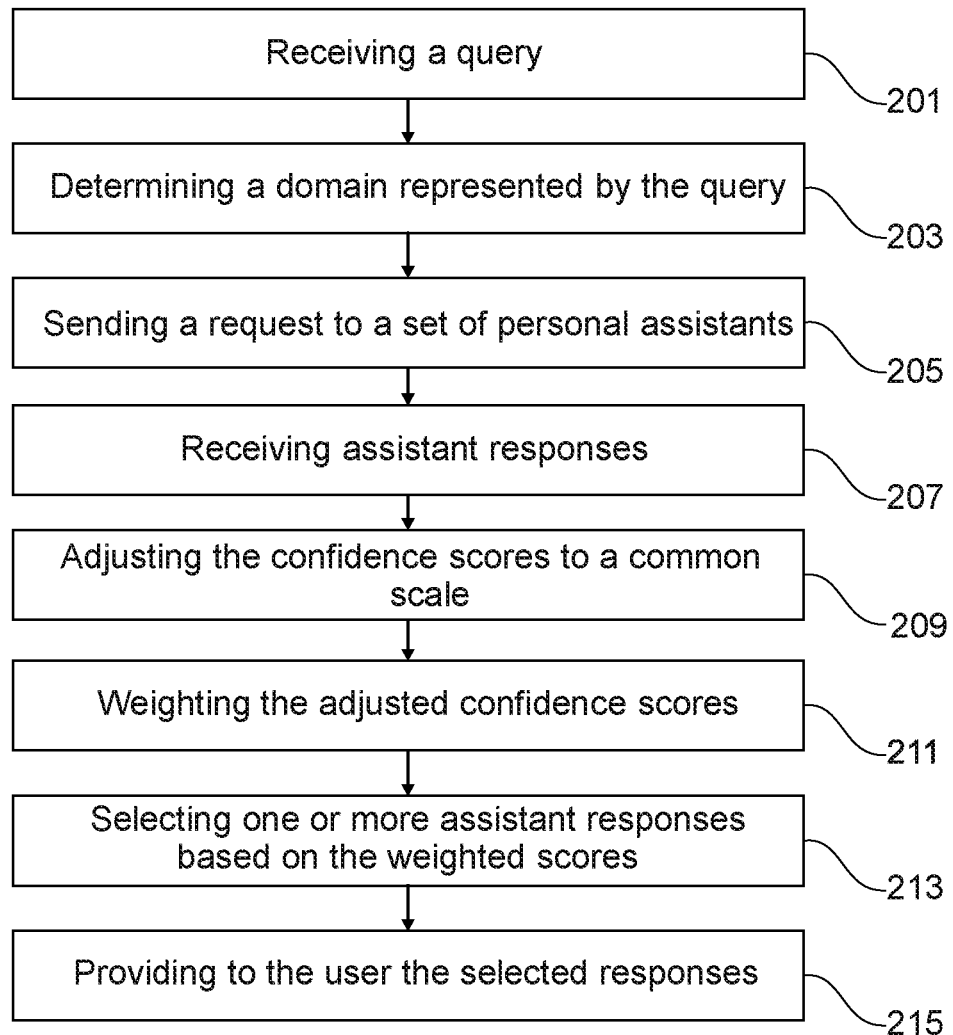
FIG. 2 is a flowchart of a method for coordinating personal assistants in accordance with an example of the present subject matter.

FIG. 2 is a flowchart of a method for coordinating personal assistants in accordance with an example of the present subject matter. For the purpose of explanation, the method described in FIG. 2 may be implemented in the system illustrated in FIG. 1, but, is not limited to this implementation. The method of FIG. 2 may, for example, be performed by the runtime unit 121 of the assistant coordinator 104.

A query may be received in operation 201 from the user 101. For example, the user 101 may enter the query via the I/O interface 102. The query may, for example, be received as a text, speech, graphics, haptics, gestures, or other modes for communication. The query may, for example, range from multi-sentence full descriptions of an information need to a few words.

The domain represented by the query may be determined in operation 203. For that, the query may be processed by a natural language processing method in order to generate semantic information. For example, the natural language processing method may extract words from the text of the query to understand the grammar dependencies to construct the semantic information, wherein the semantic information identifies an underlying domain, intent and/or entity in the query. An intent may be the ultimate user's goal behind his or her query. The intent may be defined by a name or class e.g. the semantic information may comprise a string indicating the intent. An entity may be a label word that gives a certain sentence a distinctive or a special meaning.

A request may be sent in operation 205 to a set of personal assistants 105.1 through 105.N based on the received query. For example, the result of the natural language processing method may be used to formulate the request that the personal assistants can process. In another example, the request may comprise the user input as received. That is, the received query may be forwarded to the personal assistants 105.1 through 105.N.

Upon sending the request, assistant responses A1 . . . AN may be received in operation 207 from respective personal assistants 105.1 through 105.N. Each received assistant response of the assistant responses is associated with a confidence score that the assistant response is the true response. The confidence score or level refers to a level (e.g., within a predetermined range) indicative of an amount of confidence the personal assistant has that the determined response or answer is the right one. However, due to the diversity of the personal assistants, the received confidence scores may cover different scales or ranges. The present method may solve this issue so that the confidence scores may be adjusted to a common scale in operation 209. This may, for example, result in the adjusted confidence scores in a common range between 0 and 1.

Figure 4A:
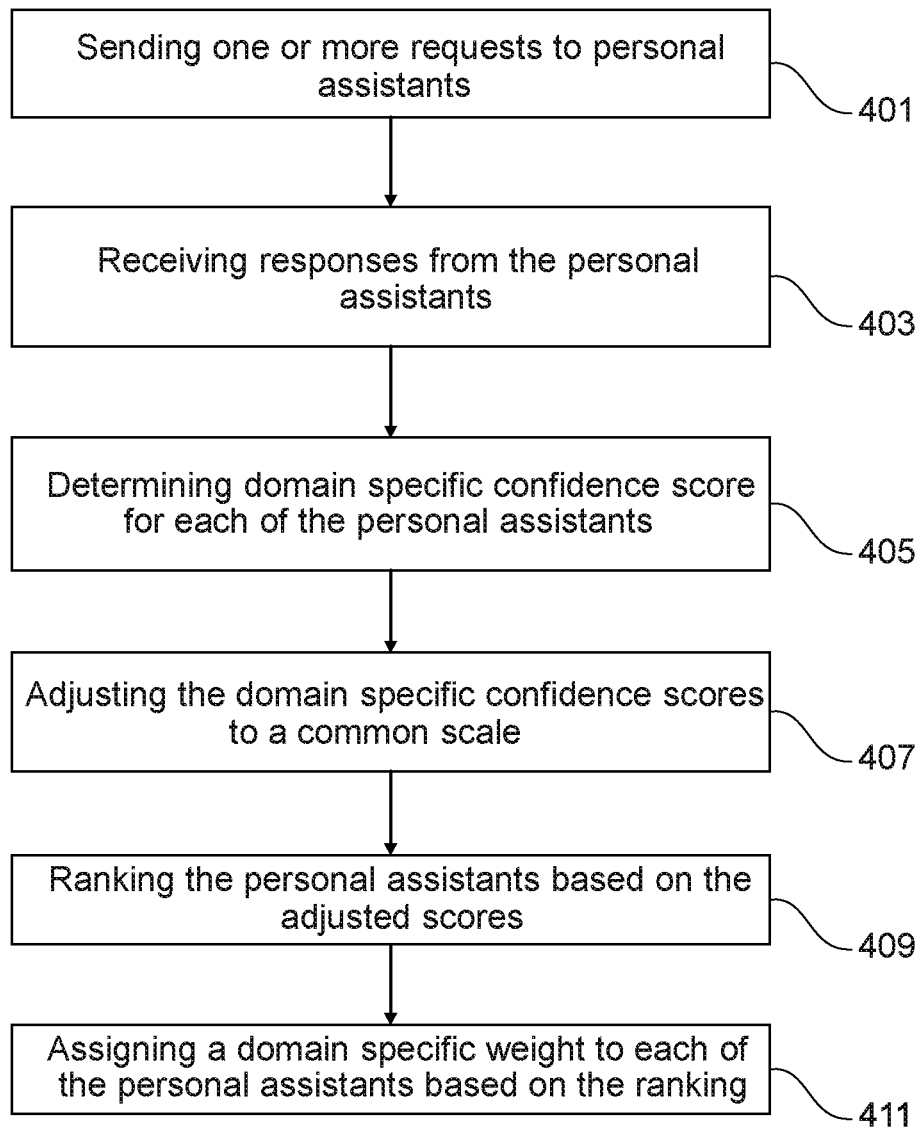
FIG. 4A is a flowchart of a method for determining domain-specific weights in accordance with an example of the present subject matter.

In addition, the personal assistants 105.1 through 105.N may not all be specialized in or optimized for the determined domain of the received query. For that, the adjusted confidence scores may be weighted in operation 211 using domain-specific weights of the personal assistants in accordance with the determined domain of the received query. FIG. 4A provides an example method for determining said weights.

One or more assistant responses of the received assistant responses may thus be selected in operation 213 based on the weighted confidence scores. For example, the assistant responses having a weighted confidence score higher than a predefined threshold may be selected.

The selected assistant responses may be provided in operation 215 to the user 101.

Figure 3A:
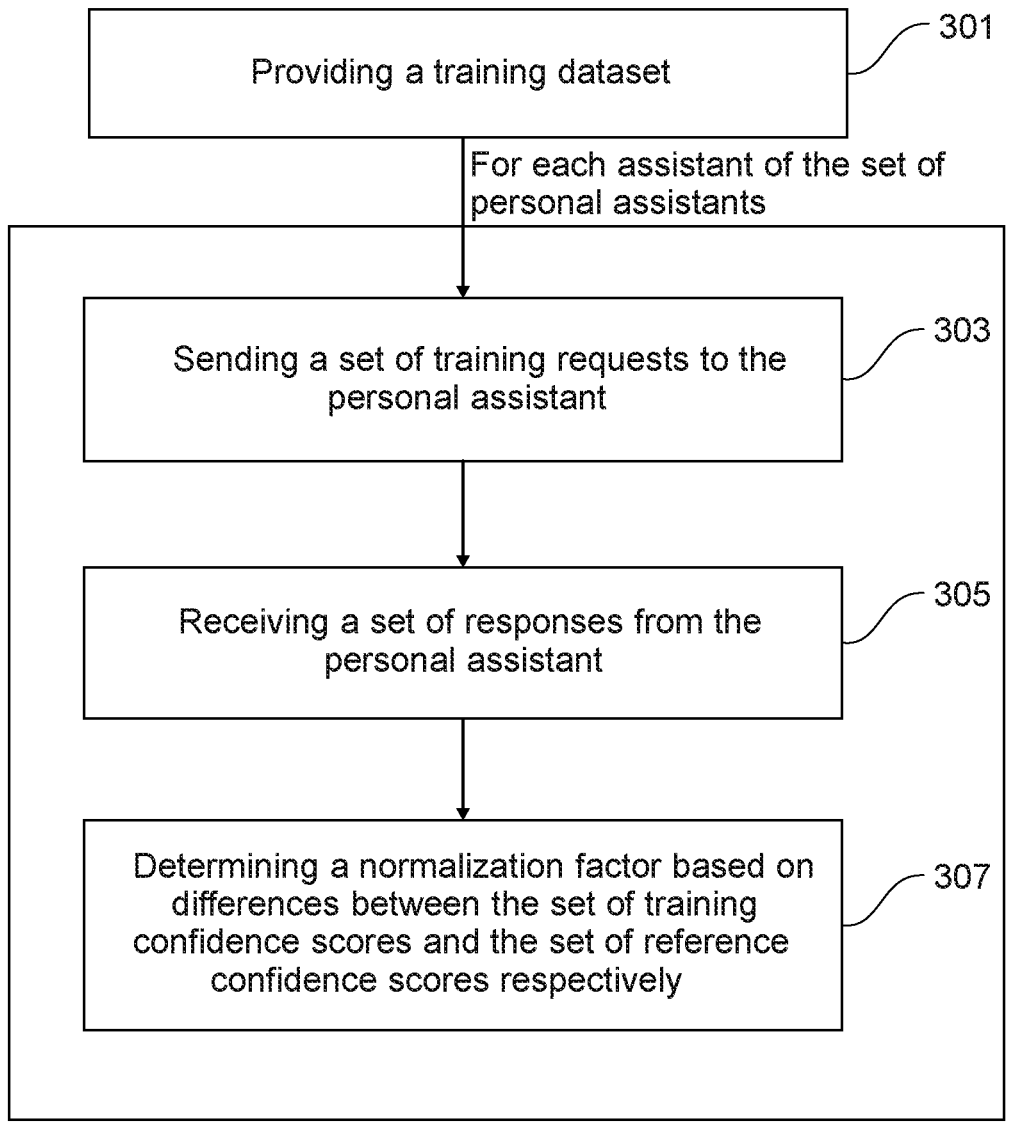
FIG. 3A is a flowchart of a method for determining normalization factors in accordance with an example of the present subject matter.

FIG. 3A is a flowchart of a method for determining normalization factors in accordance with an example of the present subject matter. For the purpose of explanation, the method described in FIG. 3A may be implemented in the system illustrated in FIG. 1, but, is not limited to this implementation. The method of FIG. 3A may, for example, be performed by the pre-processing unit 120 of the assistant coordinator 104.

A pre-processing dataset may be provided in operation 301. The pre-processing dataset comprises a set of training requests and associated reference responses, wherein each reference response is associated with a reference confidence score. The reference confidence score may, for example, be equal to 1.0 (or 100%). FIG. 3B shows an example of the pre-processing dataset. The pre-processing dataset may be provided as a table 320 having columns. The pre-processing dataset 320 comprises example training requests which are questions 321 and associated reference responses 322. Domains 323 represented by each of the questions 321 may optionally be provided as well.

For each personal assistant of the set of personal assistants the method operation 303-307 may be performed.

The set of questions 321 may be sent to the personal assistant in operation 303. In response to sending the questions 321, a set of responses may be received in operation 305 from the personal assistant. Each of the set of responses is associated with a training confidence score. This is, for example, shown in FIG. 3B, where the pre-processing dataset 320 comprises columns 324.1 through 324.N associated with the personal assistants 105.1 through 105.N respectively. As shown in FIG. 3B, each of the columns 324.1 through 324.N comprises example values of the training confidence scores associated with the received set of responses of the questions 321 respectively.

A normalization factor may be determined in operation 307 based on differences between the set of training confidence scores 324.1 and the set of reference confidence scores respectively. This is, for example, indicated in FIG. 3C. FIG. 3C depicts a table 330 comprising columns 321, 322, 324.1 through 324.n of the table 320. In addition, the table 330 comprises additional columns 325.1-n, 326.1-n and 327.1-n associated with the personal assistants respectively. However, due to the space limitation, only columns associated with the assistant 105.3 are shown. The column 325.3 comprises the assistant responses to the questions 321. The column 326.3 comprises an individual normalization factor per question 321. The individual normalization factor is defined as the difference between the reference confidence score (e.g. 1.0) and the training confidence score 324.3 of the question. For example, for the first question "How do I reset my GMail password?", the difference between the reference confidence score 1.0 and the training confidence score 0.1 of the question is 0.9. The individual normalization factor is thus 0.9 for this question. Similarly, the individual normalization factors may be defined for the remaining questions as indicated in table 330. The normalization factor 327.3 for the personal assistant may, for example, be the average of the individual normalization factors.

The adjusting of the confidence scores in operation 209 may thus be performed using the determined normalization factors 327.1-n. The confidence scores may be normalized using the determined normalization factors 327.1-n respectively.

FIG. 4A is a flowchart of a method for determining domain-specific weights in accordance with an example of the present subject matter. For the purpose of explanation, the method described in FIG. 4A may be implemented in the system illustrated in FIG. 1, but, is not limited to this implementation. The method of FIG. 4A may, for example, be performed by the pre-processing unit 120 of the assistant coordinator 104.

Operations 401 to 411 may be performed for each domain of a set of predefined domains. One or more requests (K requests, K≥1) representing the domain may be sent in operation 401 to a pool of personal assistants 105.1 through 105.N. One or more responses (K responses) regarding the respective requests may be received from each personal assistant in operation 403, wherein each response comprises a confidence score. A domain-specific confidence score may be determined in operation 405 for each personal assistant based on the K received confidence scores of the personal assistant. The domain-specific confidence score may, for example, be the average of the K confidence scores. The domain-specific confidence scores may be adjusted in operation 407 to a common scale as described with reference to operation 209. The personal assistants may be ranked in operation 409 based on the adjusted domain-specific confidence scores. Domain-specific weights may be assigned in operation 411 to the personal assistants respectively based on the ranking. For example, the first ranked assistant may be assigned the highest weight, the second-ranked assistant may be assigned the second-highest weight and so on. FIG. 4B shows a table 420 that summarizes example values of the individual normalization factors and the domain-specific confidence scores associated with the assistant 105.3. For example, the assistant answer A1 may have a domain-specific confidence score 425.1 of 0.8 for the domain of Taxes, a domain-specific confidence score 425.2 of 0.2 for the domain of Automotive, a domain-specific confidence score 425.3 of 0.2 for the domain of Healthcare, a domain-specific confidence score 425.4 of 0.3 for the domain of human resources (HR) and so on. The determined domain-specific weights may further be tuned or adjusted based on user input. For example, the table 420 of FIG. 4B may be augmented with a new column 428.3 that comprises a user normalization factor that is obtained based on the selected answer of the user. For example, for the second question (Q2) of the list of questions 321, the user has selected the answer A2 of the assistant 105.3 among all answers provided by all assistants. In this case, the user normalization factor may be associated with the answer A2 e.g. so that it may get a higher weight for the domain to which the second question Q2 belongs.

Figures 5A, 5B:
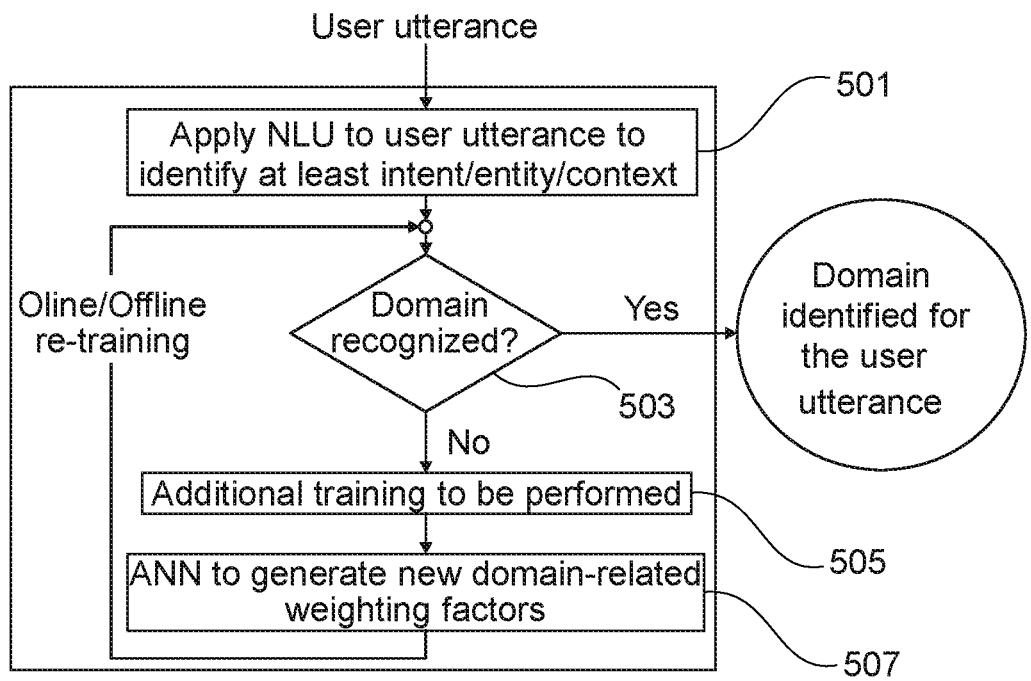
FIG. 5A is a flowchart of a method for training a domain predictive model in accordance with an example of the present subject matter.
FIG. 5B depicts an example content of a training dataset in accordance with an example of the present subject matter.

FIG. 5A is a flowchart of a method for training a domain predictive model in accordance with an example of the present subject matter. For the purpose of explanation, the method described in FIG. 5A may be implemented in the system illustrated in FIG. 1, but, is not limited to this implementation. The method of FIG. 5A may, for example, be performed by the pre-processing unit 120 of the assistant coordinator 104.

The domain predictive model may be an artificial neural network (ANN). The domain predictive model may already have been trained in order to predict a domain for a user input as described above. For example, in operation 501, a natural language processing may be applied on a received user utterance in order to identify the intent and/or entity and/or the context of the user utterance. It may be determined (operation 503) whether a domain is recognized by the domain predictive model based on the identified intent or entity or context. If the domain is recognized or predicted it may be used as described with reference to FIG. 2. In case the domain is not recognized an additional training of the domain predictive model may be performed in operation 505. This may, for example, be performed using the training set 520 as shown in FIG. 5B. Each entry of the training dataset 520 comprises a triplet formed of a request, a response of the request and a domain of the request. The training dataset 520 may, for example, be provided for a specific domain such as the domain that is not recognized in operation 503. The training of the ANN may result in new weights of the ANN in operation 507 and operations 503 to 507 may be repeated.

Figure 6:
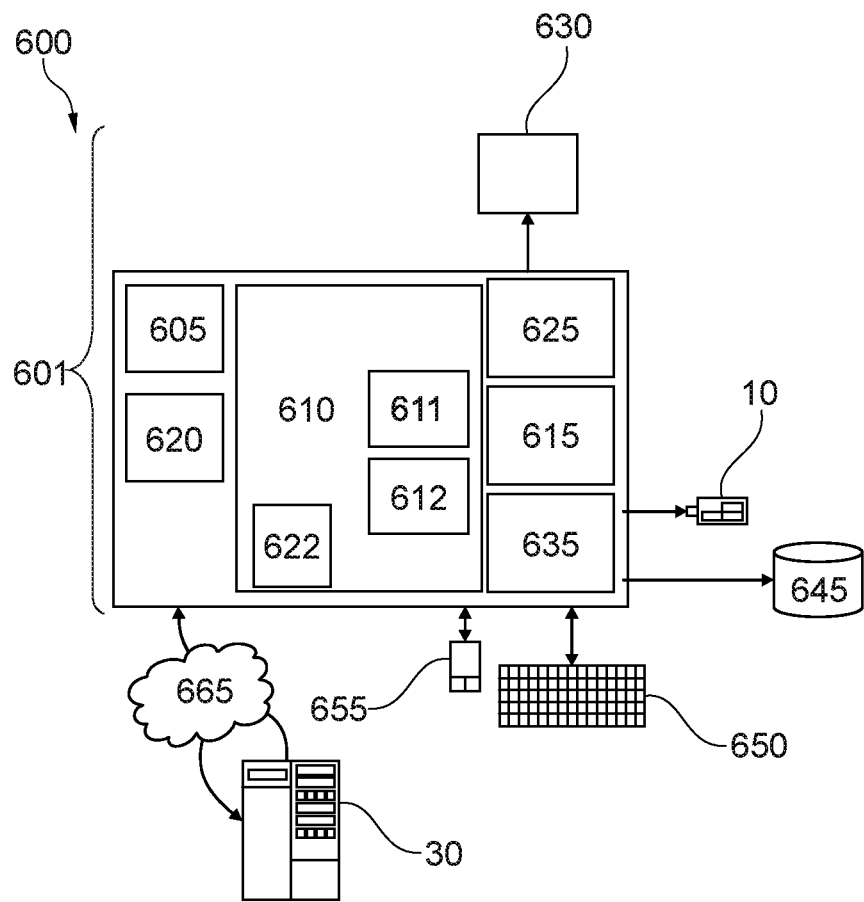
FIG. 6 represents a computerized system, suited for implementing one or more method operations as involved in the present subject matter.

FIG. 6 represents a general computerized system 600 (e.g. assistant coordinator 104) suited for implementing at least part of method operations as involved in the disclosure.

It will be appreciated that the methods described herein are at least partly non-interactive, and automated by way of computerized systems, such as servers or embedded systems. In exemplary embodiments though, the methods described herein can be implemented in a (partly) interactive system. These methods can further be implemented in software 612, 622 (including firmware 622), hardware (processor) 605, or a combination thereof. In exemplary embodiments, the methods described herein are implemented in software, as an executable program, and is executed by a special or general-purpose digital computer, such as a personal computer, workstation, minicomputer, or mainframe computer. The most general system 600, therefore, includes a general-purpose computer 601.

In exemplary embodiments, in terms of hardware architecture, as shown in FIG. 6, the computer 601 includes a processor 605, memory (main memory) 610 coupled to a memory controller 615, and one or more input and/or output (I/O) devices (or peripherals) 10, 645 that are communicatively coupled via a local input/output controller 635. The input/output controller 635 can be, but is not limited to, one or more buses or other wired or wireless connections, as is known in the art. The input/output controller 635 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices 10, 645 may generally include any generalized cryptographic card or smart card known in the art.

The processor 605 is a hardware device for executing software, particularly that stored in memory 610. The processor 605 can be any custom made or commercially available processor, a central processing unit (CPU), an auxiliary processor among several processors associated with the computer 601, a semiconductor based microprocessor (in the form of a microchip or chip set), a macro processor, or generally any device for executing software instructions.

The memory 610 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM). Note that the memory 610 can have a distributed architecture, where various components are situated remote from one another, but can be accessed by the processor 605.

The software in memory 610 may include one or more separate programs, each of which comprises an ordered listing of executable instructions for implementing logical functions, notably functions involved in embodiments of this disclosure. In the example of FIG. 6, software in the memory 610 includes instructions 612 e.g. instructions to manage databases such as a database management system.

The software in memory 610 shall also typically include a suitable operating system (OS) 611. The OS 611 essentially controls the execution of other computer programs, such as possibly software 612 for implementing methods as described herein.

The methods described herein may be in the form of a source program 612, executable program 612 (object code), script, or any other entity comprising a set of instructions 612 to be performed. When a source program, then the program needs to be translated via a compiler, assembler, interpreter, or the like, which may or may not be included within the memory 610, so as to operate properly in connection with the OS 611. Furthermore, the methods can be written as an object-oriented programming language, which has classes of data and methods, or a procedure programming language, which has routines, subroutines, and/or functions.

In exemplary embodiments, a conventional keyboard 650 and mouse 655 can be coupled to the input/output controller 635. Other output devices such as the I/O devices 645 may include input devices, for example but not limited to a printer, a scanner, microphone, and the like. Finally, the I/O devices 10, 645 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 10, 645 can be any generalized cryptographic card or smart card known in the art. The system 600 can further include a display controller 625 coupled to a display 630. In exemplary embodiments, the system 600 can further include a network interface for coupling to a network 665. The network 665 can be an IP-based network for communication between the computer 601 and any external server, client and the like via a broadband connection. The network 665 transmits and receives data between the computer 601 and external systems 30, which can be involved to perform part, or all of the operations of the methods discussed herein. In exemplary embodiments, network 665 can be a managed IP network administered by a service provider. The network 665 may be implemented in a wireless fashion, e.g., using wireless protocols and technologies, such as WiFi, WiMax, etc. The network 665 can also be a packet-switched network such as a local area network, wide area network, metropolitan area network, Internet network, or other similar type of network environment. The network 665 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 601 is a PC, workstation, intelligent device or the like, the software in the memory 610 may further include a basic input output system (BIOS) 622. The BIOS is a set of essential software routines that initialize and test hardware at startup, start the OS 611, and support the transfer of data among the hardware devices. The BIOS is stored in ROM so that the BIOS can be executed when the computer 601 is activated.

When the computer 601 is in operation, the processor 605 is configured to execute software 612 stored within the memory 610, to communicate data to and from the memory 610, and to generally control operations of the computer 601 pursuant to the software. The methods described herein and the OS 611, in whole or in part, but typically the latter, are read by the processor 605, possibly buffered within the processor 605, and then executed.

When the systems and methods described herein are implemented in software 612, as is shown in FIG. 6, the methods can be stored on any computer readable medium, such as storage 620, for use by or in connection with any computer related system or method. The storage 620 may comprise a disk storage such as HDD storage.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one operation, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method of coordinating personal assistants, the method comprising:
   receiving a query from a user;
   determining a domain to which the query belongs;
   sending a request to a set of personal assistants based on the received query;
   receiving assistant responses in response to the request from respective personal assistants of the set of personal assistants, each assistant response of the assistant responses comprising a confidence score of the respective assistant response;
   adjusting the confidence scores to a common scale;
   weighting the adjusted confidence scores using domain-specific weights of the personal assistants in accordance with the determined domain;
   selecting one or more assistant responses of the received assistant responses based on the weighted scores; and
   providing the selected assistant responses to the user.

2. The method of claim 1, further comprising:
   determining a set of training requests and associated reference responses, each reference response comprising a reference confidence score; and
   for each personal assistant of the set of personal assistants:
      sending the set of training requests to the personal assistant;
      receiving a set of responses from the personal assistant, each comprising a training confidence score; and
      determining a normalization factor based on differences between the set of training confidence scores and the set of reference confidence scores respectively, wherein the adjusting of the confidence scores comprises normalizing the confidence scores using the determined normalization factors respectively.

3. The method of claim 2, further comprising averaging the differences, wherein the normalization factor is the averaged difference.

4. The method of claim 1, further comprising:
   for each domain of a set of domains:
      sending one or more requests of the domain to a pool of personal assistants comprising the set of personal assistants;
      receiving from each personal assistant one or more responses regarding the respective requests, each response comprising a respective confidence score;
      determining for each personal assistant of the pool of personal assistants a domain-specific confidence score based on the received confidence scores of the personal assistant;
      adjusting the domain-specific confidence scores to the common scale;
      ranking the pool of personal assistants based on the adjusted domain-specific confidence scores; and
      assigning domain-specific weights for the pool of personal assistants respectively based on the ranking.

5. The method of claim 4, further comprising: selecting the set of personal assistants from the pool of personal assistants based on the domain-specific confidence scores of the determined domain.

6. The method of claim 1, further comprising:
   receiving a selection of one of the provided assistant responses; and
   adapting the domain-specific weight of the personal assistant that sent the selected assistant response.

7. The method of claim 1, wherein determining the domain to which the query belongs comprises inputting the query to a trained machine learning model in response to receiving the determined domain.

8. The method of claim 7, further comprising:
   receiving a training dataset, each entry of the training dataset comprises a triplet of a request, a response of the request, and a domain of the request; and
   training a machine learning algorithm using the training dataset, thereby generating the trained machine learning model.

9. The method of claim 7, wherein the machine learning model is an artificial neural network.

10. The method of claim 8, further comprising, in a case where the domain of the query cannot be determined, repeating the training using an updated training dataset.

11. The method of claim 1, wherein the query is any one of a voice input, video input, text input, and image input.

12. A computer program product comprising:
   one or more computer readable storage media; and
   program instructions collectively stored on the one or more computer storage media, the program instructions comprising:
      program instructions to receive a query from a user;
      program instructions to determine a domain to which the query belongs;
      program instructions to send a request to a set of personal assistants based on the received query;
      program instructions to receive assistant responses in response to the request from respective personal assistants of the set of personal assistants, each assistant response of the assistant responses comprising a confidence score of the respective assistant response;

program instructions to adjust the confidence scores to a common scale;

program instructions to weight the adjusted confidence scores using domain-specific weights of the personal assistants in accordance with the determined domain;

program instructions to select one or more assistant responses of the received assistant responses based on the weighted scores; and program instructions to provide the selected assistant responses to the user.

13. A computer system comprising:

a processor and at least one memory device operably coupled to the processor, the processor configured to:

receive a query from a user;

determine a domain to which the query belongs;

send a request to a set of personal assistants based on the received query;

receive assistant responses of the request from respective personal assistants of the set of personal assistants, each assistant response of the assistant responses comprising a confidence score of the respective assistant response;

adjust the confidence scores to a common scale;

weight the adjusted confidence scores using domain-specific weights of the personal assistants in accordance with the determined domain;

select one or more assistant responses of the received assistant responses based on the weighted scores; and provide the selected assistant responses to the user.

14. The system of claim 13, wherein the processor is further configured to:

determine a set of training requests and associated reference responses, each reference response comprising a reference confidence score; and for each personal assistant of the set of personal assistants:

sending the set of training requests to the personal assistant;

receiving a set of responses from the personal assistant, each comprising a training confidence score; and determining a normalization factor based on differences between the set of training confidence scores and the set of reference confidence scores respectively, wherein the adjusting of the confidence scores comprises normalizing the confidence scores using the determined normalization factors respectively.

15. The system of claim 14, wherein the processor is further configured to average the differences, wherein the normalization factor is the averaged difference.

16. The system of claim 13, wherein the processor is further configured to:

for each domain of a set of domains:

send one or more requests of the domain to a pool of personal assistants comprising the set of personal assistants;

receive from each personal assistant one or more responses regarding the respective requests, each response comprising a respective confidence score;

determine for each personal assistant of the pool of personal assistants a domain-specific confidence score based on the received confidence scores of the personal assistant;

adjust the domain-specific confidence scores to the common scale;

rank the pool of personal assistants based on the adjusted domain-specific confidence scores; and assign domain-specific weights for the pool of personal assistants respectively based on the ranking.

17. The system of claim 16, wherein the processor is further configured to:

select the set of personal assistants from the pool of personal assistants based on the domain-specific confidence scores of the determined domain.

18. The system of claim 13, wherein the processor is further configured to:

receive a selection of one of the provided assistant responses; and adapt the domain-specific weight of the personal assistant that sent the selected assistant response.

19. The system of claim 13, wherein the processor is further configured to:

input the query to a trained machine learning model, and in response to receiving the determined domain;

receive a training dataset, each entry of the training dataset comprises a triplet of a request, a response of the request, and a domain of the request; and train a machine learning algorithm using the training dataset, thereby generating the trained machine learning model.

20. The system of claim 19, wherein the machine learning model is an artificial neural network, wherein the processor is further configured to:

in a case where the domain of the query cannot be determined, repeating the training using an updated training dataset.

* * * * *